Inventor
Charles R. Short

By Blackmore, Spencer & [illegible]
Attorneys

Patented June 25, 1929.

1,718,589

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

VALVE TAPPET.

Application filed May 10, 1926. Serial No. 108,079.

This invention relates to new and useful improvements in internal combustion engines, and in particular to valve operating means for such engines.

One of the main objects of the invention is to provide a means for exactly compensating the expansion and contraction of valve stems caused by the varying temperatures to which such devices are subjected.

Other objects of the invention will appear hereinafter.

In the drawing.

Like numerals of reference refer to corresponding parts throughout the drawing.

Figure 1:
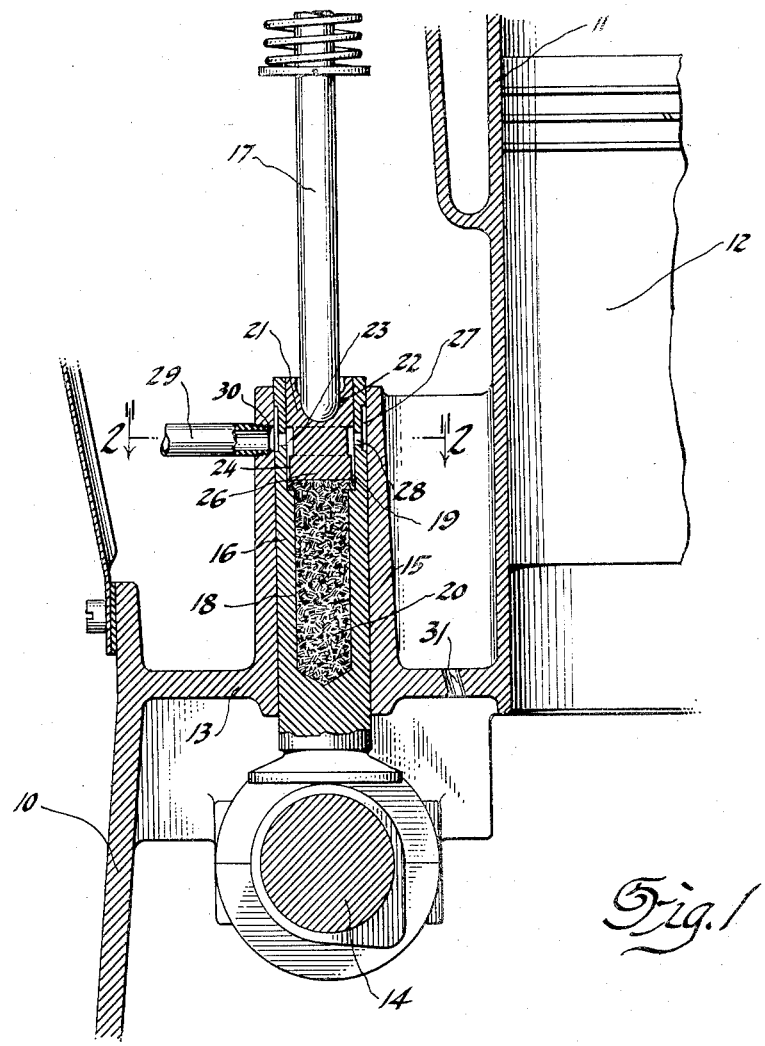
Fig. 1 is an enlarged fragmentary view of certain parts of an internal combustion engine and a valve mechanism constructed according to this invention.
Figure 2:
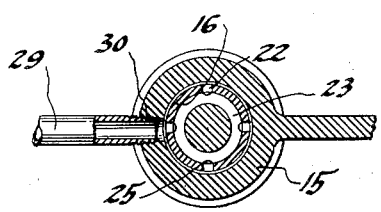
Fig. 2 is a horizontal sectional view taken on line 2—2 of Fig. 1.

Referring to the drawing, Fig. 1, shows the engine frame 10 formed with a cylinder 11 in which the engine piston 12 operates. Extending upwardly from the horizontal shelf 13 of the engine frame is a cylindrical guide or sleeve 15 to receive the valve tappet 16 which, it will be understood, actuates the valve stem 17 of the engine. The said tappet 16 is formed with an internal bore 18 and a counter-bore 19 forming a shoulder. Inside the tappet a quantity of absorbent fibrous material 20 is compressed. This fibrous material may consist of felt, or in fact any material that is compressible and has capillary properties.

A plunger 21 formed with recess 22 in its upper surface for engagement with the rounded end of the said stem 17, is fitted into the said counter-bore 19 and rests upon the compressed material 20. From an inspection of Figure 1 it will be noted that the end 26 of the plunger 21 is spaced from the adjacent shouldered portion of the tappet 16 and that a portion of the absorbent material 20 is disposed therebetween. The plunger has an annular groove 23 and one or more longitudinal grooves 24 leading from the groove 23 to the bottom of the plunger to permit oil to pass from the groove 23 of the plunger to the felt 20 therebelow. The oil may conveniently be supplied from an annular pocket 27 formed about the upper end of the said tappet, and which will collect oil from the wall of the cylindrical guide 15, and empty the same through one or more orifices 28 formed in the wall of the tappet. Or instead of obtaining oil from the source thus described it will be apparent that oil under pressure may be directed through the wall of the said cylindrical guide 15 into the said annular pocket 27 as by a pipe 29 screwed into a threaded aperture 30 formed in the top wall of the cylindrical sleeve 15. A spring (not shown) may be placed in the absorbent material for co-operating therewith to accomplish the purposes of the invention.

It is very generally known that the setting of internal combustion engine valve mechanism is quite an annoyance, as the ideal condition is to have the several parts operate as nearly as possible without any slack or clearance, but this is not practical with metal parts, and in order to be sure that the valve always seats it is customary to allow some thousandths of an inch lash or clearance. This adjustment is best when the engine is heated up to regular running temperature, and there is often considerably more lash when the engine is cold, as the valve operating parts do not expand or contract to the same extent as the engine cylinder and generally there is so much lash that a decided noise is heard.

In the present invention the absorbent material is provided between the valve tappet and the valve itself or a rod for operating the valve, and completely fills the space so that there is no lash whatever. The oil that is fed to this material as explained is absorbed by it, till all the capillary passages are filled, and when the cam lifts the tappet to open the valve, the oil is so trapped in the interstices of the material that it forms an incompressible body and the valve is operated to its full extent and no noise occurs because the several parts are in constant contact.

As the engine warms up and any change occurs in the overall length of the parts for operating the valve, the oil will either gradually soak in to fill any increase in volume that may be necessary, or will gradually ooze out to permit the material to be further compressed when less volume is required, but there can be no sudden change in this volume, and the material saturated with the oil is practically incompressible during operation. There will be no noise as there is absolutely no lash between the parts. Further, the valve will not be pounded back to its seat by the valve spring after it has been lifted by the cam, but instead will be moved exactly to the seat and no further. Thus the several parts will function perfectly at all times.

Although I have described the invention as applied for the purpose of taking up all slack in valve operating mechanism, it will be understood that the same may be applied any place where a constant volume between operating parts is desired, and modifications may be made within the spirit and scope of the invention.

I claim:

1. A valve operating means comprising a tappet and a plunger spaced therefrom, an absorbent means saturated with liquid disposed between them, and means for replenishing the liquid.

2. The combination with a crank case, of a cam shaft carried thereby, a hollow valve tappet actuated by a cam on the said cam shaft and containing absorbent material, a valve stem for co-operation with the said tappet, a plunger for supporting the said valve stem, which is in engagement with the said absorbent material, and means to direct a stream of lubricating oil to the said absorbent material whereby to take up the back-lash between the said cam and tappet.

3. In internal combustion engines, the combination with a cam shaft, a hollow tappet actuated by a cam carried on the said shaft and filled with a small quantity of compressed absorbent material, a valve, a valve spindle for co-action with the said tappet, a piston loosely carried in the top of the said tappet above the absorbent material, and means for providing a flowing stream of oil through the said tappet for moistening the absorbent material in order to retard the expansiveness of the same whereby the back-lash between the tappet and the said cam is taken up.

4. A valve compensating means comprising a hollow tappet partially filled with a compressed absorbent substance, a piston fitted in the tappet and lightly resting upon the said absorbent material, a valve spindle for co-action with the said tappet and means for percolating a liquid through the said absorbent substance whereby the expansive properties of the material is limited and governed to counter-act the shortening and elongation of the valve spindle arising from varying temperatures of operation.

5. The combination with a valve spindle for internal combustion engines, of a hollow valve tappet for co-action with the said spindle and containing a small quantity of compressed absorbent material, a stream of oil percolating therethrough, a sliding movable member carried in the upper end of the tappet and resting upon the said absorbent material for effecting a relative lengthening or shortening in the said valve stem by reason of the interaction of the same with the said stream of oil and absorbent material.

6. The combination with a cam shaft of an internal combustion engine, of a hollow tappet filled with an absorbent substance, a valve spindle for co-operation with the said tappet, a plunger slidably mounted in the upper end of the tappet and having engagement with the said valve spindle, a guide for the said tappet, and means associated with the said guide for supplying a fluid to the said absorbent material which entraps the same and maintains a relatively constant length in the valve stroke of the said spindle for all temperatures of the internal combustion engine.

7. A tappet for valves of internal combustion engines comprising in combination, an absorbent material saturated with a liquid and carried within the said tappet, an intermediate piston slidably mounted in the said tappet and arranged for engagement with the valve stem of the said valve, said piston adapted to transmit a movement caused by the expansion or contraction of the said absorbent material whereby any back-lash in the tappet is compensated.

8. In combination with an internal combustion engine, a hollow valve tappet, a fibrous material substantially filling said hollow, a counterbore in said hollow, a plunger in said counterbore, said plunger provided with means to permit the passage of oil to said fibrous material, and a valve stem seated on said plunger.

9. The combination of claim 8, and means for supplying oil under pressure to said first mentioned means.

10. A valve operating means comprising a tappet, and a plunger fitting in one end thereof, the end of the plunger spaced from the tappet, and an absorbent means saturated with liquid disposed in the space between them.

11. The combination of claim 10, and means for replenishing the liquid.

12. In combination with an internal combustion engine, a sleeve thereon, a hollow tappet slidable in said sleeve, a hollow headed plunger operating in said tappet, a valve stem seated in said head and operated therefrom, yieldable means between said plunger and tappet, and means for supplying a fluid to said yieldable means.

13. A valve operating means comprising a hollow movable tappet, means for supporting the tappet, a counterbore in said tappet, a plunger slidably operable in said counterbore, a valve operated from said plunger, and fluid absorbent means interposed between said plunger and the shoulder formed by the counterbore and extending into the hollow tappet.

14. A valve operating means comprising a hollow tappet, means for supporting the tappet, a counterbore in said tappet, a plunger slidably operable in said counterbore, a valve operated from said plunger, fluid absorbing means interposed between said plunger and the shoulder formed by the counterbore and extending into the hollow tappet, and means for supplying fluid to said absorbing means.

In testimony whereof I affix my signature.

CHARLES R. SHORT.